United States Patent [19]
Evans et al.

[11] Patent Number: 4,954,833
[45] Date of Patent: Sep. 4, 1990

[54] METHOD FOR DETERMINING ASTRONOMIC AZIMUTH

[75] Inventors: Alan G. Evans, LaPlata, Md.; William L. Stein, Fredericksburg, Va.

[73] Assignee: The United States of America as represented by the Secretary of the Navy, Washington, D.C.

[21] Appl. No.: 376,278

[22] Filed: Jul. 5, 1989

[51] Int. Cl.$^5$ .............................................. G01S 5/02
[52] U.S. Cl. .................................. 342/357; 364/459
[58] Field of Search ..................... 342/356, 357, 352; 364/455, 459; 33/268

[56] References Cited

U.S. PATENT DOCUMENTS

| | | | |
|---|---|---|---|
| 3,706,496 | 12/1972 | Geier et al. | 356/149 |
| 4,093,383 | 6/1978 | Feist et al. | 356/152 |
| 4,096,646 | 6/1978 | Solem | 35/43 |
| 4,244,651 | 1/1981 | Roof | 33/268 |
| 4,550,601 | 11/1985 | Evans | 73/382 |
| 4,599,620 | 7/1986 | Evans | 343/357 |
| 4,664,519 | 5/1987 | Hullein et al. | 356/152 |
| 4,696,109 | 9/1987 | Whaley, Jr. | 33/1 |
| 4,702,008 | 10/1987 | Suzuki et al. | 33/1 |
| 4,741,245 | 5/1988 | Malone | 342/357 |

OTHER PUBLICATIONS

Carter, et al., "The Accuracy of Astronomic Azimuth Determinations," Bull. Geodetic Survey, vol. 52, #2, pp. 107–113, 1978.
*Physical Geodesy*, Heiskanen and Moritz, Freeman & Co., San Francisco, 1967, pp. 184–189.
"Dept. of Defense World Geodetic System–Its Definition & Relationships with Local Geodetic Systems," DMA TR 8350.2, Sep. '87.

*Primary Examiner*—Ian J. Lobo
*Attorney, Agent, or Firm*—John D. Lewis; Kenneth E. Walden

[57] ABSTRACT

An improved method for fixing position of a land-based target site with respect to a reference site in the natural coordinate frame comprising the steps of determining geodetic azimuth between the target site and the reference target using Global Positioning System (GPS) satellites and relative positioning survey techniques; then calculating a relationship using gravity vertical deflections; and then coverting the geodetic azimuth to astronomic azimuth. This method has several advantages over conventional methods of targeting, including speed, the ability to work in all weather conditions, and improved accuracy.

7 Claims, 2 Drawing Sheets

METHOD FOR DETERMINING ASTRONOMIC AZIMUTH

ORIGIN OF THE INVENTION

The invention described herein was made in the performance of official duties by employees of the Department of the Navy and may be manufactured, used, licensed by or for the Government for any governmental purpose without payment of any royalties thereon.

BACKGROUND OF THE INVENTION

1. Field of the Invention

The invention relates satellite navigation systems and more particularly improved methods for determining azimuths using Global Positioning System (GPS) satellites.

2. Description of the Prior Art

The prior art methods to determine astronomic azimuth generally use a theodolite and precision clock. Astronomic azimuth is azimuth calculated at a refernce site in the natural coordinates. Angles to a reference star and to a target location are measured and time marked. Based on knowing star location and angles at these time marks, and taking the spin of the earth into account, an estimate of astronomic azimuth is made using data collected over, generally, a several hour time period.

The prior art procedures require precision theodolites. This equipment is very expensive and sensitive to mechanical damage. Additionally, clear weather is required in order to sight stars. The conventional method is limited in accuracy. Depending on equipment, accuracy is usually not better than one arcsecond.

SUMMARY OF THE INVENTION

An object of the invention is to provide a method for determining astronomic azimuth which can be accomplished independent of weather conditions. A further object of the invention is to provide a method which can be accomplished rapidly and without requiring the use of theodolite equipment. Yet another object of the invention is to provide a method of determining astronomic azimuth which can provide high degrees of accuracy in the arcsecond range. These and other objects of the present invention are accomplished by providing a novel method for determining astronomic azimuth.

The invention is a method for determining astronomic azimuth by first determining geodetic azimuth and then converting to astronomic azimuth by using gravity vertical deflections as a reference. Geodetic azimuth is determined by reference to Global Positioning System satellites using relative positioning survey techniques. Astronomic azimuth is azimuth calculated at a reference site in the natural coordinates. The determination of vertical deflections may be accomplished by any of three procedures.

BRIEF DESCRIPTION OF THE DRAWINGS

The above objects and numerous other advantages of the present invention will be readily understood from the following detailed description when read in view of the appended drawings wherein.

DETAILED DESCRIPTION OF THE INVENTION

Figure 1:
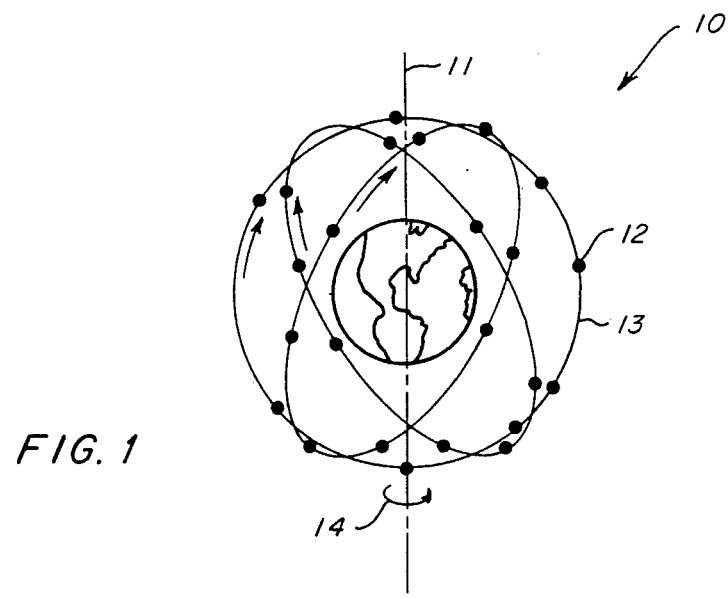
FIG. 1 is a diagrammatic view of the Global Positioning System that embodies the present invention.

Referring now to FIG. 1, an improved method for determining astronomic azimuth to a target is disclosed using the Global Positioning System satellites, depicted generally by the numeral 10, for an initial reference. The Global Positioning System comprises a 24-satellite array, each of which satellites transmits a pair of distinct, coded L-band signals. Receiver apparatus comprise a further part of the Global Positioning System, and allow location or orientation of various platforms, such as aircraft or weapons systems. The 24-satellite array provides sufficient coverage that at least four satellites 12 will be in view of a receiver antenna from any point on or above the surface of the earth regardless of satellite position in the respective orbits 13. Compensation for earth spin 14 is also determined and geodetic azimuth measurements can be determined relative to true north 11.

Certain weapons delivery systems require astronomical azimuth information in order to be properly targeted. Included among these delivery systems are ballistic systems which operate in an inertial frame and cannot be targeted by geodetic reference alone. Additionally, astronomical azimuth is required to determine the rotation of tectonic plates. The geodetic reference frame is an ellipsoidal model of the earth. The current model utilized by the global positioning system is the World Geodetic System 1984 (WGS 84).

Figure 2:
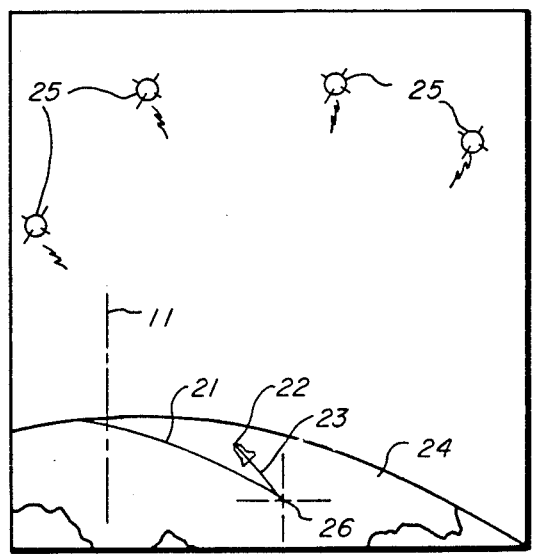
FIG. 2 is a perspective view of a portion of the globe showing the parameters to be determined by the method of the present invention.

Referring to FIG. 2, a depiction of the surface of the earth 24 is shown with true north 11 and zero azimuth line 21 depicted as a reference for use in the method of the present invention. Target point 22 has determinable geodetic azimuth 23 from reference point 26. Relative positioning techniques from the Global Positioning Satellite 25 permit a determination of geodetic azimuth 23.

Figure 3:
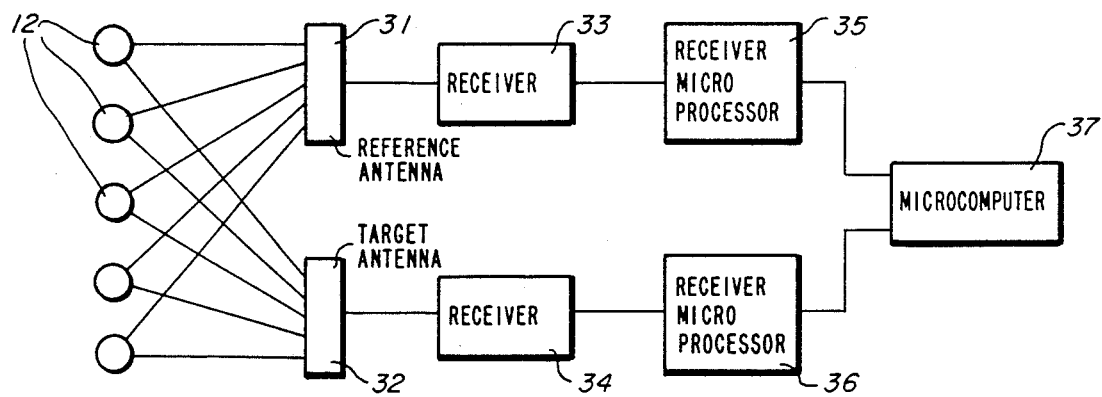
FIG. 3 is a block diagram depicting the Global Positioning System receiver, timing, and computation device used to determine astronomic azimuth.

FIG. 3 depicts a typical configuration of two receivers and apparatus suitable for use in the method of the present invention. The Global Positioning System satellite array with satellites 12 transmissions received by reference antenna 31 and target antenna 32. The antennae are generally separated by a distance of 1 to 10 km, although not restricted to these distances. The signal enters the receivers 33 and 34 is further processed by the receiver microprocessors 35 and 36. Data is available for each satellite in the form of precise phase measurements taken at each receiver at very nearly the same time marks Microcomputer 37 processes this data to determine relative position and geodetic azimuth between target antenna 32 and reference antenna 31. Microcomputer 37 further processes gravity vertical deflection information and converts geodetic azimuth to astronomic azimuth.

Figure 4:
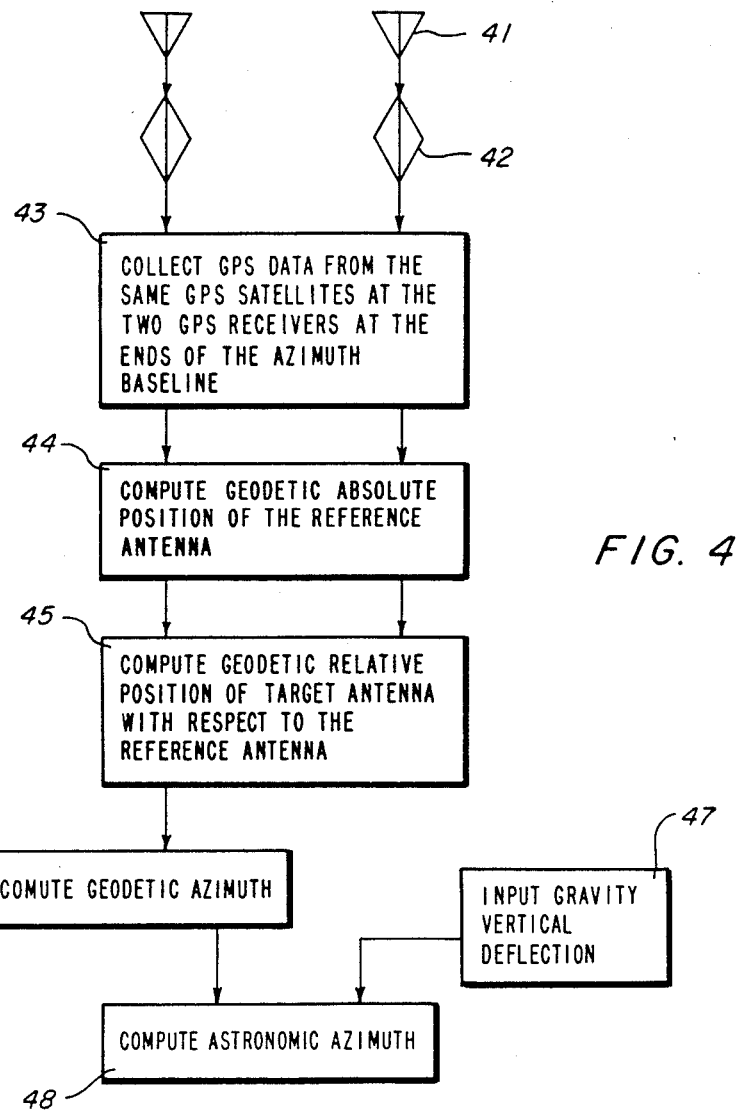
FIG. 4 is a flow diagram of the apparatus of FIG. 3.

The process of the method of the present invention can be visualized by reference to FIG. 4 wherein the functions of the receiver apparatus are depicted. Antenna 41 receives the signal which is fed to receiver 42 and compared by component 43 to other signals received and further by component 44 where the geodetic absolute position of the reference antenna is computed. Data is further processed by component 45 where the geodetic relative position of the target antenna with respect to the reference antenna is computed. These functions are the usual Global Positioning System satellite functions which directly provide data for the method herein. Data is further processed by component 45 where the geodetic relative position of the target antenna with respect to the reference antenna is computed. Global Positioning System data is processed by component 46 which provides geodetic azimuth to any selected target. Component 47 provides gravity vertical deflections at the reference site 26 as shown in FIG. 2. One of three methods is used. The first and conventional method uses a theodolite and determines astronomic latitude and longitude. These values are differenced, as a function of latitude, with geodetic latitude and longitude, which are determined from GPS absolute positioning techniques. The second method uses a leveling survey to obtain the change in orthometric height. The change in undulation between two points is then the difference between these two quantities. The average vertical deflection along a baseline is then determined from the ratio of the change in undulation to the distance of the baseline, determined from GPS relative positioning techniques. The third method obtains vertical deflection from a mathematical model of gravity using geodetic latitude, longitude and height determined from GPS relative positioning techniques. The first method is the most accurate means for determining vertical deflection hence the greatest accuracy in determining astronomic azimuth. The advantages of the second and third methods are that stellar observations are not required and weather conditions are not critical. Further, the third method provides a quick computer calculation based on a mathematical model.

Component 48 processes the geodetic azimuth obtained from the GPS and the vertical deflections to generate the astronomical azimuth. Given the vertical deflections, $\eta$, the north component and $\xi$, the east component at the reference site, the difference in the azimuth is given by:

$$\Delta\alpha = A - \alpha$$

Where $A$ = Astronomic azimuth
$\alpha$ = Geodetic azimuth
The difference consists of two parts, $$\Delta\alpha = \Delta\alpha_1 + \Delta\alpha_2$$

Where $\Delta\alpha_1 = \phi \tan \eta$
$\Delta\alpha_2 = (\epsilon \sin \alpha - \eta \cos \alpha) \cot z$
Here $\phi$ = Geodetic latitude
$Z$ = angle between the geodetic azimuth and the target location = Zenith distance. In many applications Z is close to 90° hence $\Delta\alpha_2$ is a small quantity.

It will be apparent to those skilled in the art that many modifications and variations of the present invention can be made within the scope of the above teachings. It is therefore to be understood that, within the scope of the appended claims, the invention may be practiced otherwise than as specifically described.

What is claimed is:

1. A method for determining astronomic azimuth between a fixed site and a target comprising the steps of:
   (a) determining geodetic azimuth, $\alpha$, from the fixed site where geodetic azimuth is defined as the angle from true north (mean polar axis of the earth) to the target in a plane normal to an ellipsoidal model of the gravity vector;
   (b) determining at the fixed site a gravity deflection of the vertical, comprising $\eta$ the east component and $\xi$ the north component which when combined is the angular difference between an actual gravity vector direction and the ellipsoidal model gravity vector direction; and
   (c) calculating astronomic azimuth, A, defined as the angle from true north to the target in a plane normal to the actual gravity vector, from geodetic azimuth using relationships derived from gravity vertical deflections: $A\alpha + \eta \tan \phi + (\xi \sin \alpha - \eta \cos \alpha) \cot z$ where $\phi$ = geodetic latitude at the fixed site $z$ = geodetic zenith distance (generally, $z \approx 90°$ and $\cot z \approx 0$)

2. A method for determining astronomic azimuth as in claim 1 wherein the step of determining geodetic azimuth comprises calculating a geodetic azimuth value based on Global Positioning System satellites using relative positioning survey techniques.

3. A method for determining astronomic azimuth as in claim 1 wherein the step of determining gravity vertical deflections comprises measurement by theodolite to determine astronomic latitude and longitude and by further calculation wherein astronomic latitude and a projection of astronomic longitude are subtracted from equivalent geodetic values.

4. A method for determining astronomic azimuth as in claim 3 wherein said geodetic latitude and longitude are determined by Global Positioning System absolute positioning techniques.

5. A method for determining astronomic azimuth as in claim 3 wherein the step of determining gravity vertical deflection comprises determining change in orthometric height established by leveling survey and comparing that value with a change in geodetic height found by Global Positioning System relative positioning techniques.

6. A method for determining astronomic azimuth as in claim 3 wherein the step of determining gravity vertical deflection comprises calculation of deflection values using a mathematical model and geodetic latitude, longitude, and height determined by reference to Global Positioning System satellites.

7. A method for determining astronomic azimuth as in claim 3 wherein the step of calculating astronomic azimuth from geodetic azimuth comprises adjusting geodetic azimuth based on the relationship with gravity vertical deflection by adding two correction terms made up of components of vertical deflection and Zenith distance.

* * * * *